S.W. Palmer & Chas. Coventry.
[Assignees of M.C. Cronk & S.W. Palmer]
4497
Imp't in Washing Machines.
REISSUED AUG 1 1871
Fig. 1.
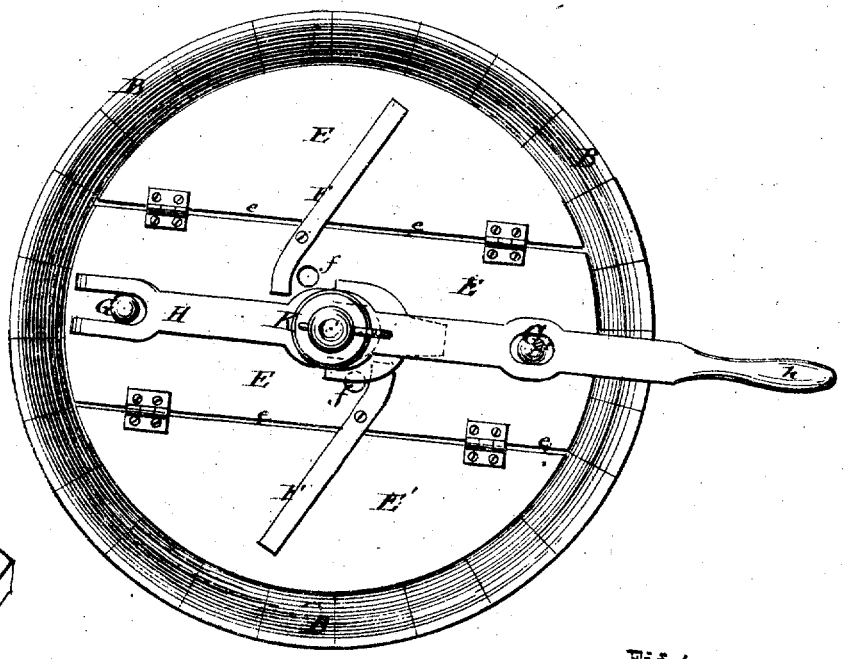
Fig. 3.
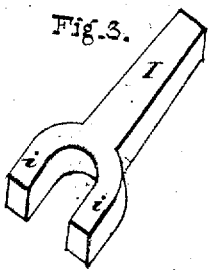
Fig. 2.
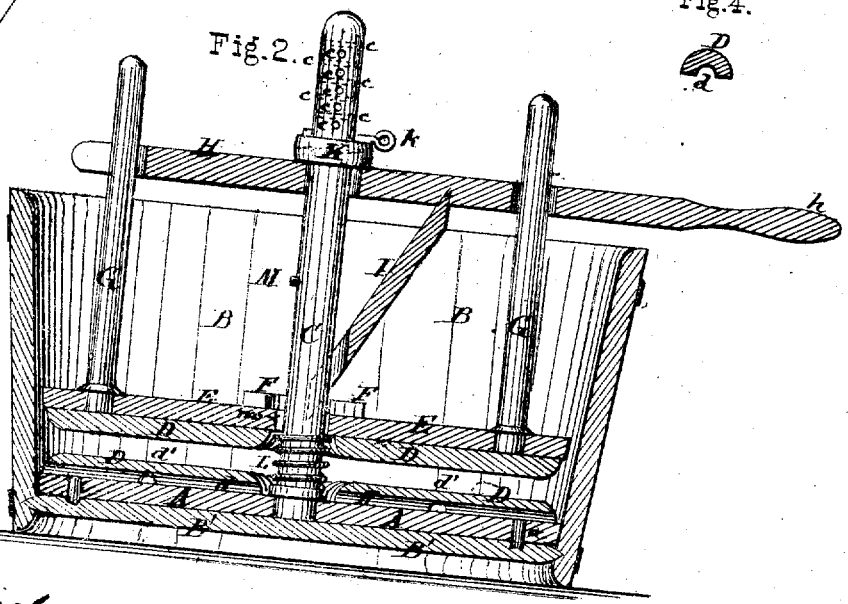
Fig. 4.
Witnesses.
Chas. H. Poole.
John B. Young
Assignees.
Sidney W. Palmer and Charles Coventry, by Prindle and Dyer, their Atty's.
AM. PHOTO-LITHOGRAPHIC CO. N.Y. (OSBORNE'S PROCESS.)

UNITED STATES PATENT OFFICE.

SIDNEY W. PALMER AND CHARLES COVENTRY, OF AUBURN, NEW YORK, ASSIGNEES OF MUNSON C. CRONK AND SIDNEY W. PALMER.

IMPROVEMENT IN WASHING-MACHINES.

Specification forming part of Letters Patent No. 40,330, dated October 20, 1863; reissue No. 4,497, dated August 1, 1871.

*To all whom it may concern:*

Be it known that [redacted], MUNSON C. CRONK and SIDNEY W. PALMER, of Auburn, in the county of Cayuga and State of New York, did obtain of and from the United States Letters Patent for certain Improvements in Washing-Machines bearing date of October 20, 1863, and numbered 40,330, which Letters Patent have been found defective in that specification, and claims do not cover and embrace all of the original invention and improvements as contained in the drawing filed in the United States Patent Office on the 31st day of August, 1863.

Now, therefore, we, SIDNEY W. PALMER and CHARLES COVENTRY, of Auburn, aforesaid, sole owners of the said Letters Patent, being desirous to reissue the same in manner and form prescribed by law, have prepared and do hereby declare that the following is a full, clear, and exact description of the said improvements, reference being had to the accompanying drawing making a part of this specification, in which—

Figure 1 is a plan view of the improved washer. Fig. 2 is a vertical central section of the same. Fig. 3 is a perspective view of the fulcrum-bar, and Fig. 4 is a cross-section of one of the ribs forming a part of the rubbers.

Letters of like name and kind refer to like parts in each of the figures.

This invention relates to what is known as tub washing-machines; and it consists principally in the employment of two circular disks or rubbers, provided upon their contiguous faces with a series of ribs, and combined with each other and with an ordinary wash-tub in the manner and for the purpose substantially as hereinafter set forth. It further consists in the employment of a lever pivoted upon the central standard, secured to the lower rubber, and passing over the outer standards attached to the upper rubber, by means of which said upper rubber may be rotated horizontally, substantially as and for the purpose hereinafter specified. It further consists in the employment of a fulcrum-bar constructed as described, and combined with the lever, the upper rubber, the central standard, and with a suitable adjustable stop secured upon the latter above said lever, substantially as and for the purpose hereinafter shown. It further consists in combining, with the radial water-channels above named, a series of lateral openings leading from the same into the open spaces between the ribs, substantially as and for the purpose hereinafter shown and described. It further consists in the employment of one or more vertical openings provided in and through the upper rubber near its center, and so combined with suitable curved guides as to cause water to be drawn inward and pass downward into the space below said rubber, substantially as and for the purpose hereinafter specified. It further consists in combining, with the rubbers before mentioned, a spiral spring, substantially as and for the purpose hereinafter set forth. It further consists in a standard permanently attached to and extending upward from the center of the lower rubber, and combined with the upper rubber and its operating mechanism in the manner and for the purpose substantially as hereinafter shown. It further consists in forming the upper rubber of three sections, and in connecting said sections together, in the manner and for the purpose hereinafter specified. It finally consists in the means employed for securing the rubber in an elevated position, substantially as and for the purpose hereinafter set forth.

In the annexed drawing, A represents a circular disk of wood, corresponding in exterior size with the interior of a tub, B, of usual construction, upon the bottom B′ of which it rests, and with which it is connected radially by means of one or more dowel-pins, *a*, extending downward from said disk into suitable holes provided within said bottom. Secured to and projecting vertically upward from the center of said disk is a round standard, C, while upon its upper face is secured a number of half-round ribs, D, each provided upon its under side with a longitudinal channel, *d*, and with one or more lateral openings, *d′*, and all arranged radially and at equidistant points around said disk, their outer ends being nearly flush with its circumference, while between their inner ends and the standard is left a sufficient space to afford free access to said channels, the whole forming the lower or fixed rubber. The second or upper rubber, E, corresponding in size and shape with that before described, and having a series of similar ribs, D, arranged in a like manner, is provided with a central opening, having a somewhat greater diameter than the standard C, so as to permit said rubber to be passed over the same and rest upon said lower rubber A. Said rubber is divided into three sections, E and E′, having equal breadth, and so hinged together as to leave between their contiguous edges a narrow opening, *e*, the object of which will be hereinafter explained. In order that said sections may be secured in position when placed in a line transversely and horizontally, a bar, F, is pivoted upon the upper face of the central section E at each side, and extends in one direction diagonally across the same and in an opposite direction across the adjoining outer section E′, and when in such position prevents the latter from being raised. Extending vertically upward from near each end, and at the transverse center of the middle section E, is a standard, G, somewhat less in height and diamter than that before described, C. A lever, H, provided with a projecting handle, *h*, and with suitable openings, is placed over said standards C and G, and furnishes a means whereby said upper rubber E may be rotated horizontally with relation to the lower rubber A. In order that the lever H may be sustained in vertical position, and at the same time permit a downward pressure to be exerted upon the upper or movable rubber, a fulcrum-bar, I, provided with a forked end, *i*, is placed between said lever and rubber, with said forked end spanning the standard C and resting within suitable notches cut within the sides of the section E, while the upper end of said lever passes into and engages with a suitable notch cut within said lever midway between said standard C and the standard G upon the side of the handle *h*. A collar, K, placed around the standard C immediately above the lever, and secured in vertical position by means of a pin, *k*, placed within one of a series of corresponding holes, *c*, passing horizontally through the upper portion of said standard, prevents said lever from sliding upward when its outer end is depressed, as would otherwise be the case, and, therefore, enables a downward pressure to be communicated through the fulcrum-bar to the upper rubber. A spiral spring, L, placed around the lower end of the standard C, and exerting a vertical pressure against the lower side of the upper rubber, raises the same and holds it in the position shown in Fig. 2, except when forced downward by the action of the lever.

The device thus constructed is operated as follows: The upper rubber and its operating mechanism being removed, the soiled clothing, together with a suitable quantity of boiling suds, are placed within the tub and said rubber replaced. The operator now grasps the handle of the lever and while applying thereon a downward pressure, moves it horizontally in either direction, so as to correspondingly rotate the upper rubber, the necessary movement of which is from one-eighth to one-quarter of a revolution, by which means the clothes are caused to move back and forth upon each other and upon the lower rubber, the amount of such movement depending upon the degree of pressure communicated to the lever. Whenever a rib upon the upper rubber passes over a rib upon the lower rubber a large proportion of the water contained in the intervening clothes is squeezed out and immediately thereafter absorbed as said ribs pass out of line, said operation of expression and absorption being carried on continually and simultaneously at as many points as there are opposing ribs upon the rubbers. By removing the pressure occasionally from the lever, and permitting the upper rubber to be raised by the spiral spring, said rubber will be released from the clothes, and may then be partially rotated, so as to bring it into a new position with relation to said clothes, after which the pressure may be again applied and operations continued. The tendency of the semi-rotary movement of the rubber and the downward pressure of the same is to throw the water outward from the center, leaving the latter point poorly supplied were it not for the channels cut in the ribs upon the lower rubber, through which water passes freely inward. A further supply of water is secured by means of two holes, *f*, passing vertically through the central section E of the upper rubber, upon opposite sides of its center and immediately adjoining the inner curved ends of the buttons F, in which position said buttons act as guides, and, when said rubber is turned to the left, force water toward the center of the same, from whence it immediately passes downward through said openings into the space beneath. When it is desired to examine the clothes the buttons may be turned so as to permit the hinged sections of the upper rubber to be raised. In closing down said sections the spaces *e*, left between their inner edges and the edges of the central section, prevent injury to the rubber or to the clothing should any remain within said spaces. In order to enable the clothing to be turned within or removed from the tub, it is necessary that the upper rubber should be raised and secured in a vertical position, to accomplish which a stud, M, is secured within and projects horizontally outward from the central standard near the upper edge of said tub. An opening, *m*, corresponding in size and shape to said stud, is cut within one side of the central opening within the rubber, so that, when said stud and opening are caused to coincide, said rubber may be raised over the former, when, by rotating the rubber slightly until its solid portion is brought opposite said stud, it will remain suspended thereon.

Having thus fully set forth the nature and merits of our invention, what we claim as new is—

1. The rubbers A and E provided with the radial ribs D, and the standards C and G in combination with each other, the levers H and I, the collar K, and with a common wash-tub, substantially as and for the purpose specified.

2. In combination with the rubber E and with the standards C and G, the lever H, fulcrum-bar I, and collar K, substantially as and for the purpose described.

3. The fulcrum-bar I and *i*, constructed as described, and combined with the standard C, the lever H, and the collar K, substantially as and for the purpose shown.

4. In combination with the longitudinal channels *d* cut within the ribs D, the lateral openings *d′*, substantially as and for the purpose specified.

5. In combination with the rubber E and the buttons or guides F, the vertical openings *f*, substantially as shown and for the purpose described.

6. In combination with the rubbers A and E, the spring L, substantially as and for the purpose shown.

7. In combination with the rubber A and its operating mechanism, the standard C, permanently attached to and extending upward from the center of said rubber, substantially as shown, and for the purpose set forth.

8. In combination with the rubber E and standard C, the stud M and recess *m*, substantially as shown, and for the purpose described.

In testimony whereof we have hereunto set our hands and seals this 9th day of June, 1871.

SIDNEY W. PALMER. [L. S.]
CHARLES COVENTRY. [L. S.]

Witnesses:
A. E. WARRINER,
J. F. PALMER.